United States Patent [19]

Taylor

[11] Patent Number: 4,930,536
[45] Date of Patent: Jun. 5, 1990

[54] PIPELINE ROAD CROSSING SEALING SYSTEM

[76] Inventor: Julian S. Taylor, 8300 SW. 8th, Oklahoma City, Okla. 73128

[21] Appl. No.: 411,766

[22] Filed: Sep. 25, 1989

Related U.S. Application Data

[63] Continuation-in-part of Ser. No. 353,570, May 18, 1989.

[51] Int. Cl.$^5$ ............................................. F16K 17/14
[52] U.S. Cl. ................................. 137/70; 73/40.5 R; 405/157
[58] Field of Search ...................... 137/70, 68.1, 375; 405/157; 73/40.5 R, 49.1

[56] References Cited

U.S. PATENT DOCUMENTS

| | | | |
|---|---|---|---|
| 2,587,933 | 3/1952 | Volpin | 137/70 |
| 2,816,575 | 12/1957 | Stokes | 405/157 |
| 2,954,797 | 10/1960 | Dryer | 137/375 |
| 3,459,229 | 8/1969 | Croft | 73/49.1 |
| 3,582,533 | 6/1971 | Albright et al. | 405/157 |
| 4,469,469 | 9/1984 | Kennedy, Jr. | 405/157 |
| 4,723,441 | 2/1988 | Sweeney | 73/40.5 R |
| 4,724,857 | 2/1988 | Taylor | 137/70 |

Primary Examiner—John Rivell
Assistant Examiner—L. R. Leo
Attorney, Agent, or Firm—Robert K. Rhea

[57] ABSTRACT

In a pipeline road crossing a pipeline is loosely surrounded by a casing under the roadbed with its ends vented to the atmosphere and sealed with the periphery of the pipeline to minimize oxidation of the pipeline wall within the casing. Access and pressure relief valves are connected with the casing vents at opposite sides of the road. This permits injecting gas under pressure into the casing annulus through the valve equipped vents and periodically monitoring the gas pressure.

10 Claims, 2 Drawing Sheets

4,930,536

PIPELINE ROAD CROSSING SEALING SYSTEM

CROSS REFERENCE TO RELATED APPLICATION

This application is a continuation-in-part of an application filed by me in the United States Patent and Trademark Office on May 18, 1989, under Ser. No. 07/353,570 for Road Crossing Seal System.

BACKGROUND OF THE INVENTION

1. Field of the invention.

The present invention relates to pipelines and more particularly to minimizing oxidation of pipelines under a roadbed.

2. Description of the prior art.

It has been common practice to surround that portion of a pipeline, extending transversely of a roadbed beneath the soil, with a length of loosely surrounding casing to minimize oxidation of the line. Further, the respective ends of the casing are preferably sealed with the perimeter of the pipeline to prevent moisture contacting the pipeline within the surrounding casing. The casing is usually vented to the atmosphere at opposite sides of the road so that, in the event of a pipeline rupture under the roadbed, any fluids would be safely discharged laterally of the road.

With proper seals interposed between the inner periphery of the casing and the periphery of the pipeline, which electrically isolates the pipe line from the road crossing casing, an inert gas can be injected through one of the vents with the vents provided with closeable valves. With the gas under greater than atmospheric pressure substantially all corrosive action on the perimeter of the pipeline is eliminated.

This invention provides access valves and low pressure vent relief valves to accomplish this purpose.

SUMMARY OF THE INVENTION

A pipeline road crossing includes a pipeline extending transversely of a roadbed with a casing loosely surrounding and sealed at its respective ends with the periphery of the pipeline. Valve equipped vents provide communication between the atmosphere and the annulus of the casing laterally of the roadbed. Access and relief valves normally close the vents and maintain a gas under greater than atmospheric pressure in the casing.

The principal object of this invention is to provide access and pressure relief valves for a pipeline road crossing vents which provides access to the annulus around the pipeline for charging the annulus with a gas, under greater than atmospheric pressure, monitoring the pressure and releasing it if it exceeds a predetermined maximum.

DESCRIPTION OF THE PREFERRED EMBODIMENTS

Figure 1:
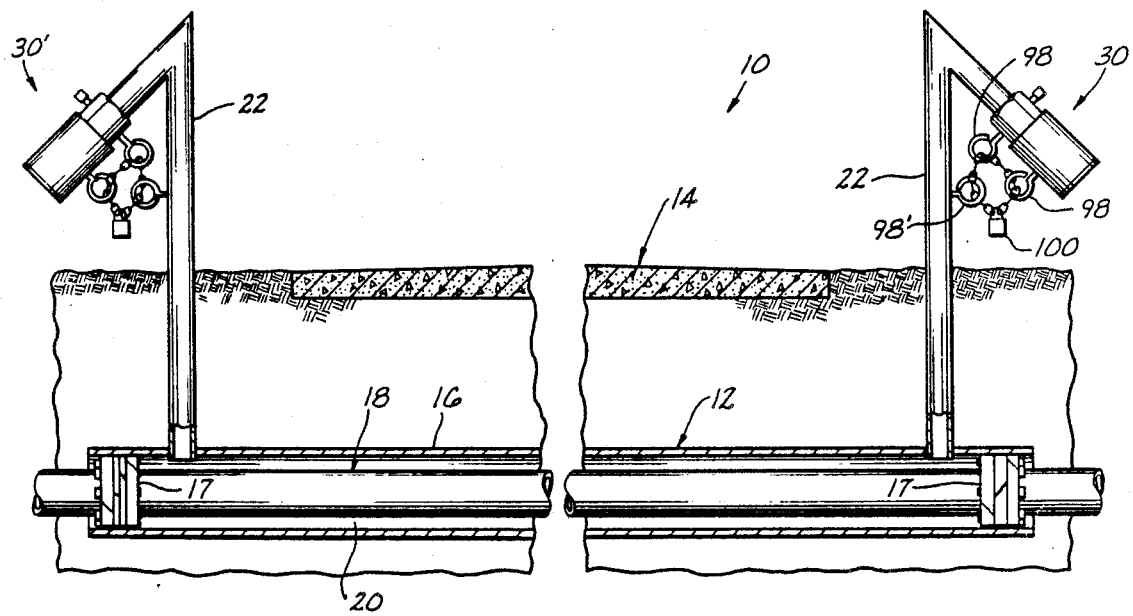
FIG. 1 is a fragmentary vertical cross sectional view of a pipeline road crossing.
Figure 2:
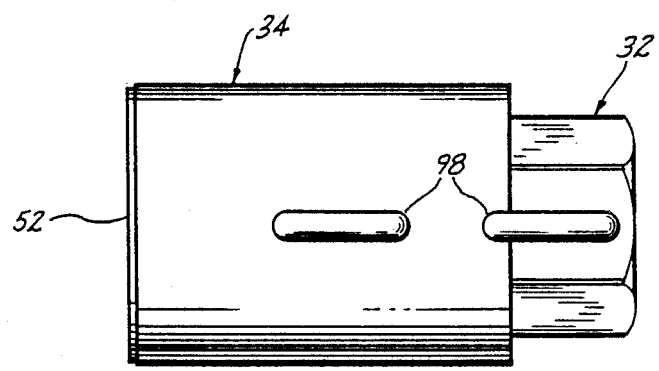
FIG. 2 is an elevational view of the vent closing valves with the valve rotated 90° about its longitudinal axis from the position shown by FIG. 1.
Figure 4:
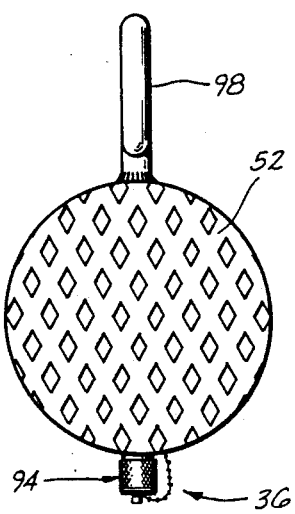
FIG. 4 is a left end elevational view of FIG. 3.

Like characters of reference designate like parts in those figures of the drawings in which they occur. In the drawings:

The reference numeral 10 indicates a typical highway, shown in vertical section, and a typical installation of pipeline means 12 crossing the highway right-of-way in underlying relation with respect to the highway roadbed 14. The crossing 12 includes a casing 16 loosely surrounding and sealed, as at 17, at its end portions with the periphery of a pipeline 18 by pairs of rigid split ring members impinging and radially inwardly and outwardly expanding resilient split ring seals to form a gas tight annulus 20 between the casing and pipeline. The casing annulus is vented to the atmosphere by conventional tubular vents 22 on opposing sides of the roadbed.

The reference numerals 30 and 30' indicate the valve means which normally close the exhaust end of the road crossing vents 22. Since the valve means 30 and 30' are identical, only the valve means 30 is described in detail, in the interest of brevity.

Figure 3:
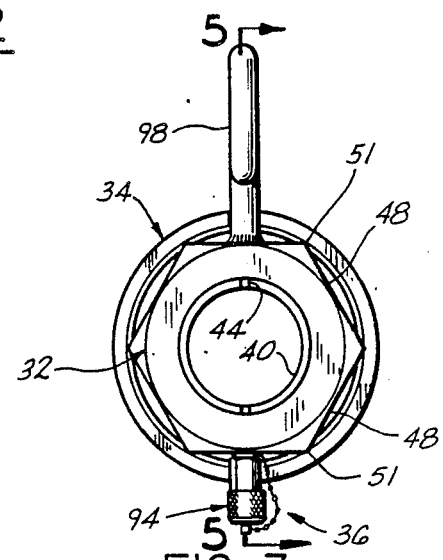
FIG. 3 is a right end elevational view of FIG. 2 with the valve further rotated 90° about its longitudinal axis.
Figure 5:
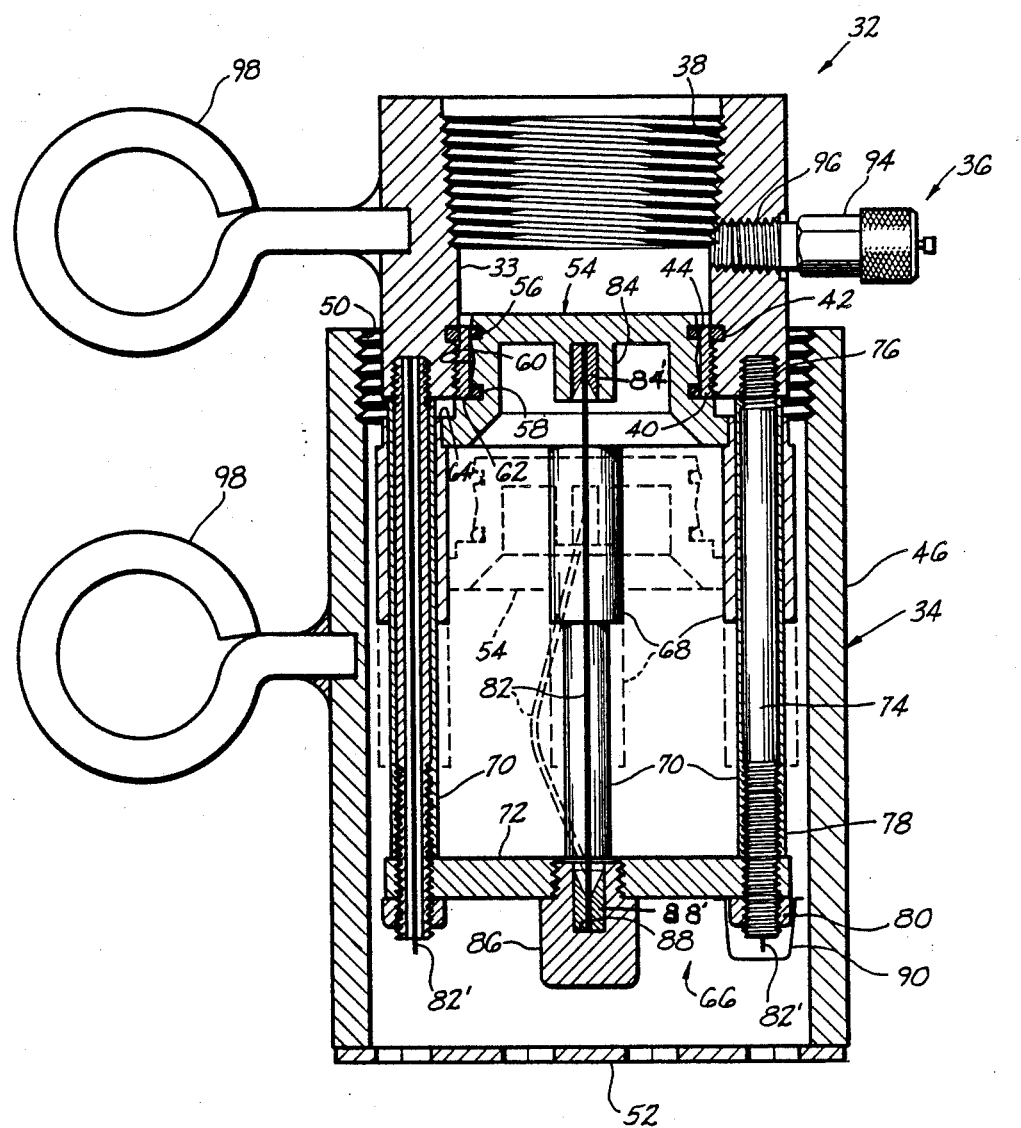
FIG. 5 is a longitudinal sectional view of the pressure relief vent valve taken substantially along the line 5—5 of FIG. 3 and rotated from the position of FIG. 3 to dispose its longitudinal axis vertically.

The valve means 30 comprises a hexagonal head portion 32, a sleeve body portion 34, an access valve means 36, (FIGS. 1, 3 and 5). The head 32 is centrally bored as at 33 and threaded as at 38 for connection with the exhaust end portion of the respective road crossing vent 22. The other end portion of the head 32 is provided with a threadedly connected ring-like valve seat 40, having opposing spanner wrench sockets 44, sealed at its inner limit with the head bore 33 by an O-ring 42.

The sleeve-like body means 34 comprises a sleeve 46 which loosely surrounds the flats 48 of the hexagonal head 32. This end portion of the sleeve 46 is internally threaded as at 50 for threaded engagement with the externally threaded points 51 (FIG. 3) of the hexagonal head to maintain a rigid coaxial connection between the sleeve 46 and the head 32. The opposite end of the sleeve 46 is provided with a foraminated disc 52 which may be a section of expanded metal, if preferred, for the purpose believed presently apparent.

A cup-shaped piston forms a valve 54 with one end portion closely received in sliding relation by the valve seat 40 and is sealed therewith by longitudinal spaced O-rings 56 and 58. The piston valve seating end portion is circumferentially recessed, as at 60, between the position of the seals 56 and 58 to form a pressure relief space between the seals 56 and 58 in the event of fluid seepage cross the seal 56.

The other or outward end portion of the piston valve is provided with a step diameter flange forming one annular shoulder 62 abutting the outward end of the valve seat 40 and a second shoulder 64 normally disposed in spaced relation with respect to the outward end of the head 32. The piston valve means 54 when seated with the seat 40 thus closes the exhaust end of the road crossing vent 22 for the purposes presently explained.

The sleeve 46 contains a piston valve guide means 66 for maintaining the piston valve axially aligned with the head 32 and valve seat 40 when unseated by excess pressure in the road crossing vent 22. This valve guide means 66 comprises a plurality (4), only three being shown, tubular guides 68 connected at one end in 90° spaced relationship with the larger diameter of the flanged end of the piston valve 54. These tubular guides 68 slidably surround a like plurality of sleeves 70 in turn closely surrounding a like plurality (4) of bolts 74 extending between the outwardly disposed end of the head 32 and a guide plate 72 axially disposed downstream from the piston valve 54.

One end of each bolt 74 is threadedly connected as at 76 with the head 32 and its other end portion is provided with threads 78 slidably received by the guide plate 72. Nuts 80 on the bolts 74 abut the guide plate 72 against the adjacent ends of the sleeves 70.

As shown by dotted lines (FIG. 5) the piston valve 54 may be moved axially outward, by fluid pressure, against its inward end, toward the foraminated plate 52. During this movement the guide means 66 is maintained concentric with the valve seat 40 by the guides 68 sliding relative to the sleeves 70.

The piston valve 54 is normally maintained seated with the valve seat 40 by an elongated rod herein called a pin, as shown by the bold line 82 (FIG. 5) extending axially between the piston valve 54 and the guide plate 72. The cup shaped piston valve 54 is provided with a central boss 84 which is centrally bored for receiving a first pin bushing 84' surrounding one end portion of the pin 82. The guide plate 72 is centrally bored for threadedly receiving a pin support 86 in turn centrally bored to form a socket 88 similarly receiving a second pin bushing 88' surrounding the other end portion of the pin 82. The pin 82 is fabricated to yield (bend) in response to a predetermined axially applied pressure.

In the event of a pipeline leak under the roadbed, within the casing 16 and between its sealed ends, excess pressure above a predetermined value unseats the piston valve 54 by bending the pin 82, moving the valve 54 toward its dotted line position of FIG. 5. Bending or collapsing the pin 82 releases excess pressure in the annulus 20 through the threaded end of the sleeve 46 at the position of the hexagonal flats 48 and through the foraminated disc 52. The pin 82 limits the amount of pressure, to not exceed a predetermined value, within the annulus 20.

The piston valve 54 may be resealed with its seat 40 after being unseated and the problem, if any, has been corrected by manually removing the sleeve 46, removing the pin nesting socket 86 and manually removing the damaged pin 82. Extra pins 82', only one being shown, are contained by hollow bores formed in the several bolts 74.

One of the pins 82' is inserted in the bushings 84' and 88' and the socket 86 is reinstalled to complete the repair. These extra pins 82' being maintained within the bolts by snap-on plastic caps 90, only one being shown, covering the bolt nuts 80.

The access valve means 36 comprises a vent bore access valve 94 which is threadedly connected with the head 32 by a threaded bore 96 formed in the wall thereof downstream from the connected end limit of the respective vent pipe. The access valve 94 is fully disclosed in my Patent No. 3,794,289 and principal comprises a generally cylindrical plug which is centrally bored and provided with O-ring seals, not shown, for receiving an elongated relatively small centrally bored probe such as is disclosed in my Patent No. 3,630,080. A quantity of gas, not shown, may be injected into one vent 22 and the annulus 20 through either access valve 94, while venting air from the annulus through the other vent, to pressurize the annulus to a certain value, for example, below or one or two pounds psi above atmospheric pressure. The access valve 94 thus permits charging the road crossing system and supplementing the charge with a selected gas as well as permitting a testing of the quantity of gas contained by the annulus 22 by a probe and pressure gauge such as is disclosed by my above mentioned Patent No. 3,630,080.

To prevent tampering with or removal of the sleeve means 34, a pair of security ring eyelets 98 are rigidly connected with the wall of the head 32 and sleeve means 34, respectively, for receiving a flexible element threaded through these two eyelets 98 and companion eyelet 98' rigidly secured to a vertical portion of the vent 22 for receiving a padlock 100.

Obviously the invention is susceptible to changes or alterations without defeating its practicability. Therefore, I do not wish to be confined to the preferred embodiment shown in the drawings and described herein.

I claim:

1. In an elongated fluid conductor traversing a roadway in downward vertically spaced relation with respect to the roadway and loosely surrounded by a casing sealed at its respective end portions with the exterior of the conductor and forming an annulus around the conductor, said casing having a vent pipe at its respective end portions open to the atmosphere at opposite sides of the roadway, the improvement comprising:
relief valve means for normally closing the end of said vent pipes opposite said casing,
said valve means having valve head means connected with the respective said end of said vent pipes and having a valve seat opposite the pipe vent connection;
a valve sealing with said valve seat;
sleeve means for axially guiding said valve toward and away from said valve seat;
plate means for supporting said sleeve means;
a plurality of bolts connecting said plate means with said valve head means in axially spaced relation with respect to the valve; and,
elongated pressure responsive pin means axially interposed between said valve and said plate means for normally maintaining said valve sealed with said seat.

2. The combination according to claim 1 in which the sleeve means includes:
a like plurality of sleeves respectively surrounding said bolts; and,
a like plurality of tubular guides respectively surrounding said sleeves in longitudinal sliding relation and secured to said valve.

3. The combination according to claim 2 and further including:
an open end sleeve jacket secured to said valve head means and surrounding said sleeve means and said plate means.

4. The combination according to claim 2 and further including:
access valve means laterally connected with said valve head means upstream from said valve for communicating with the interior of said vent pipe.

5. The combination according to claim 4 and further including:
means locking said valve head means and said sleeve jacket to said vent pipe for preventing angular rotation of one with respect to the other.

6. In a pipeline crossing for passing an elongated carrier pipe under the earth's surface in downward vertically spaced relation with respect to an obstacle on the surface and surrounded by a casing sealed near its respective end portions with the exterior of the carrier pipe to form an annulus around the carrier pipe, the casing having a vent line communicating with the surface, the improvement comprising:

valve means above the surface on the vent line normally closing said vent to said casing,
said valve means having valve head means connected with said vent line and having a valve seat opposite the vent line connection;
a valve for sealing with said valve seat;
sleeve means for axially guiding said valve toward and away from said valve seat;
plate means spaced from said valve seat for supporting one end of said sleeve means;
a plurality of elongated members connecting said plate means with said valve head means in axially spaced relation with respect to said valve; and,
elongated pin means axially interposed between said valve and said plate means for normally maintaining said valve in a sealed position with respect to said valve seat.

7. The combination according to claim 6 in which said sleeve means includes:
a like plurality of sleeves coextensive with the spacing between said plate and said valve head means respectively surrounding said elongated members; and,
a like plurality of tubular guides secured to said valve and respectively surrounding said sleeves in longitudinal sliding relation.

8. The combination according to claim 7 and further including:
a sleeve jacket secured to said valve head means and surrounding said sleeve means and said plate means.

9. The combination according to claim 6 and further including;
access valve means connected with said valve head means for providing fluid communication with said vent line upstream from said valve.

10. The combination according to claim 8 and further including:
means locking said valve head means and said sleeve jacket to said vent line for preventing angular rotation of one with respect to the other.

* * * * *